Jan. 9, 1923.

W. J. WISCH.
NUT LOCK.
FILED SEPT. 2, 1921.

1,441,619.

Inventor
Walter J. Wisch
By Thur. W. Johnson
Attorney

Patented Jan. 9, 1923.

1,441,619

UNITED STATES PATENT OFFICE.

WALTER J. WISCH, OF BALTIMORE, MARYLAND, ASSIGNOR TO THE BULL DOG LOCK WASHER CO., OF BALTIMORE, MARYLAND, A CORPORATION OF MARYLAND.

NUT LOCK.

Application filed September 2, 1921. Serial No. 497,835.

*To all whom it may concern:*

Be it known that WALTER J. WISCH, citizen of the United States, residing at Baltimore city, in the State of Maryland, has invented certain new and useful Improvements in Nut Locks, of which the following is a specification.

This invention relates to improvements in nut locks, and more particularly to a washer adapted for interposition between the nut and the face or surface of a member or members to be secured together.

The object of the invention is to improve upon the nut lock shown and described in Patent Number 1,319,894, granted to Harry G. Norwood, and dated October 28, 1919, and the nut lock shown and described in Patent Number 1,378,116, granted May 17, 1921, to G. R. Holmes and Walter J. Wisch, and particularly in that in the present form of washer, the flat surface of the periphery of the nut operates simultaneously upon the rigid tongues of the washer to rock it away from a concentric position, to cause the inner edge of the washer to forcefully impinge against the threads of the bolt, and furthermore, to provide a washer that will be effective to positively lock the nut against retrograde movement upon the shank of the bolt, regardless of whether or not the hole in the nut is concentric therewith, or slightly off center, it being understood, that it frequently occurs that the hole in the nut is not true or concentric.

The invention contemplates a washer which is designed to turn freely with the nut in turning it home upon the shank, but which will, by reason of the peculiar formation of the aperture or opening in the washer, which embraces the shank, cause the washer to bite quickly into the threads of the shank and thus prevent retrograde movement of the nut.

In the drawings illustrating the invention—

Figure 1:
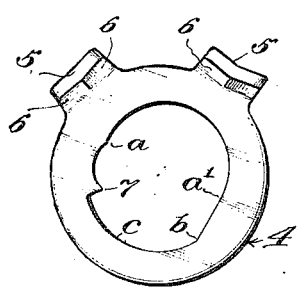
Fig. 1 is a face view of the washer.

Referring to the drawings, the numeral 1 designates a bolt of ordinary construction, and 2 an ordinary hexagonal nut adapted for bolting together two members, such as 3. The numeral 4 designates my improved washer. This is formed of thin metal provided upon its periphery with the rigid tongues 5 inclining slightly upward as shown, the under faces of the tongues being bevelled from their centers as indicated at 6, the bevels being upward from the centers of said tongues. These tongues cooperate with the hexagonal faces of the nut whereby the points of the angles engaging the tongues carry the washer with the nut in threading the nut upon the bolt. The washer is arranged to loosely fit upon the bolt, and the opening in the washer is variously formed for the purpose of cooperating with the nut and threads of the bolt, in such a way that portions of the inner edge of the opening in the washer will bite or dig into the threads of the bolt to prevent retrograde movement.

Figure 2:
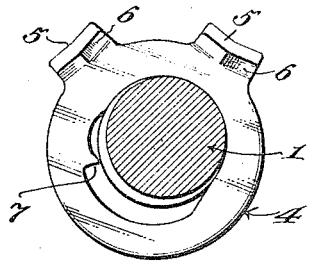
Fig. 2 is an end view of a shank of a bolt with the washer in position thereon before the nut is threaded on the shank.
Figure 3:
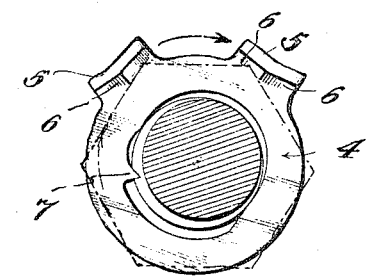
Fig. 3 is a view similar to Fig. 2 showing the position of the washer upon the shank of the bolt, or the position the washer assumes when there is any tendency toward retrograde movement, or the position that the washer will be forced to when an effort is made to remove the nut, the nut being shown in dotted lines.
Figure 4:
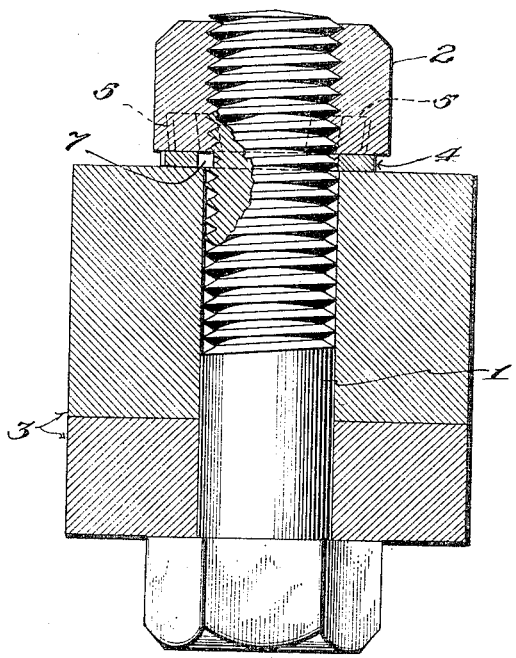
Fig. 4 is a central sectional view of the nut lock and cooperating parts.
Figure 5:
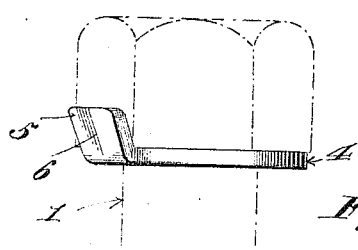
Fig. 5 is an edge view of the washer, the nut and a portion of the shank of the bolt being shown in dotted lines.

A portion of the opening in the washer is concentric, as for instance between the points $a$, $a'$, and from the points $a'$ to $b$, a substantially straight edge is formed tangential to the concentric portion of the opening, and this straight part merges into the eccentric part $c$, there being provided at the end of the concentric portion and substantially opposite the straight part, a spur 7, adapted to cooperate with the straight portion to cause the edge of the opening to forcefully impinge upon, or bite into the threads of the bolt at the very beginning of the slightest retrograde movement of the nut on the bolt. The washer is placed upon the bolt in the position shown in Fig. 2, that is to say, the concentric portion of the washer, in which position the washer can turn freely with the nut, in turning the nut home upon the bolt. However, as shown in Fig. 3, at the beginning of the retrograde movement of the nut upon the bolt, the peripheral surface of the nut acting against the tongues 5, and more particularly, upon the under angular surfaces thereof, will immediately lift the washer transversely of the bolt, causing the straight portion of the inner edge of the washer, or that portion between $a'\ b$ to ride against the threads of the bolt, this portion of the washer acting with a wedging tendency or cam-like action to cause the spur to bite quickly into the threads of the bolt opposite the straight portion, which movement will furthermore bring about a binding action between the straight portion of the washer and the threads, thus the spur and the straight portion of the washer will grip the bolt, alligator-wrench fashion, thus effectually preventing a retrograde movement.

The lock above described is particularly practical since it necessitates no modification or change in the ordinary bolt and nut, thus adapting it for use in connection with the nuts and bolts used to fasten together machinery parts subject to great vibration.

While I have shown two rigid lugs on the periphery of the washer, I desire it understood that I may employ one lug, or a number greater than two, if desired, and while I have shown provided opposite the straight portion of the interior periphery of the washer a single spur, such as 7, a number of spurs may be employed.

Claims.

1. In combination with a threaded bolt and nut and member through which the bolt is extended, a washer loosely arranged upon the bolt between the member and the nut, said washer having a rigid tongue adapted to be engaged by the outer peripheral surface of the nut, the opening in the washer being partly concentric and partly eccentric, there being a straight portion connecting the concentric and eccentric portions of the opening, and a spur arranged substantially opposite the straight portion, all operating substantially as and for the purpose set forth.

2. In combination with a threaded bolt and nut and member through which the bolt is extended, a washer loosely arranged upon the bolt between the member and the nut, and having a rigid tongue engageable by the outer periphery of the nut, the opening in the washer being formed with a concentric and eccentric portion, and a straight portion connecting the two on one side of the washer, a spur substantially opposite the straight portion, and at the end of the eccentric portion, the engagement of the nut with the tongue being adapted to cause a cam action between the threads of the bolt and the straight portion of the washer, causing said portion and the spur to dig into the threads to prevent retrograde movement of the nut.

3. In combination with a threaded bolt and nut, and a member through which the bolt is extended, a washer loosely arranged upon the bolt between the member and the nut, said washer having means adjacent its periphery adapted to be engaged by the outer surface of the nut, the opening in the washer being partly concentric and partly eccentric, there being a straight portion between the eccentric and concentric portions of the opening, the straight portion being adapted to wedge against the shank of the bolt upon the movement of the nut to prevent retrograde movement of same, means on the inner periphery of the opening for also impinging against the threads of the bolt, said means cooperating with the straight portion of the opening to form a double engagement or lock between the washer and bolt threads upon a retrograde movement of the nut.

4. In combination with a threaded bolt and nut, and a member through which the bolt is extended, a washer loosely arranged upon the bolt between the member and the nut, said washer having laterally extending means adjacent its periphery for engagement with the surface of the nut, the opening in the washer being partly concentric and partly eccentric, there being a straight portion between the concentric and eccentric portions of the opening, and a spur arranged substantially opposite the straight portion, the straight portion being adapted to impinge against the threads of the bolt upon retrograde movement of the nut, and in so doing cause the spur to bite into another portion of the threads of the bolt to effect a multiple lock against retrograde movement of the nut.

5. A washer of the character described comprising a flat plate, means adjacent the periphery of the plate for engagement with a nut, an opening in the plate for the passage of a bolt, the opening being partly concentric and partly eccentric and formed with a straight portion between the concentric and eccentric portions, and a spur or spurs on the inner periphery of the opening substantially opposite the straight portion cooperating with the straight portion when the nut engaging means are engaged by a nut to bring about a multiple lock against retrograde movement of a nut upon the threads of a bolt.

In testimony whereof I affix my signature in presence of two witnesses.

WALTER J. WISCH.

Witnesses:
C. D. BULL,
M. A. AHERN.